Patented Feb. 9, 1932

1,844,417

UNITED STATES PATENT OFFICE

HENRI LOUIS BARTHELEMY, OF MILAN, ITALY, ASSIGNOR TO RUTH ALDO COMPANY INC., OF NEW YORK, N. Y., A CORPORATION OF NEW YORK

TREATMENT OF CELLULOSE ACETATE SOLUTION

No Drawing. Application filed July 28, 1927, Serial No. 209,162, and in France December 28, 1926.

This invention is a novel process for the manufacture of cellulose acetate intended for subsequent industrial utilization. The invention produces cellulose acetates that are remarkably stable and of great practical value; and it includes novel steps, and sequence of steps, used in performing the process as set forth in the claims, and hereinafter more fully explained.

From scientific and patent literature it is known that cellulose esters, especially cellulose acetates, can be obtained by the action of anhydrides (diluted or not by suitable solvents) upon cellulose in the presence of a catalyst. This latter may consist, for instance, of a strong mineral acid, acid salts (such as alkali-bisulphates), salts with acid reaction (for instance copper sulphate or zinc chloride), or free halogens (chlorine, bromine and iodine).

It is also known that, contrary to what was formerly assumed, sulfuric acid can lead to excellent results, in spite of its very high catalytic activity.

On the other hand, it has been ascertained that, while leading to the formation of apparently good commercial products, sulfuric acid exhibits serious disadvantages which do not become fully apparent until after a comparatively long time has elapsed. Just as the stability of gun-cotton and of nitrocelluloses generally depends, in large measure, upon the small amount of sulfuric esters formed during nitration (see Hervé, Moniteur Quesneville, September, 1913), it has been observed that the stability of the cellulose acetates and cellulose nitroacetates produced in the presence of sulfuric acid depends to a large extent on the same cause, and that acetates which were initially perfect during the first year after their production, became more and more acid in the course of time, in consequence of the presence of unstable sulfuric esters of the cellulose, until they finally became quite useless for ordinary purposes, having lost their strength.

It has been discovered that this grave disadvantage can be obviated, and that the cellulose sulfo-acetates formed during the esterification can be eliminated completely, while at the same time the value of the final product is increased considerably as regards both solubility and the intrinsic physical and chemical properties of the final products. This can be accomplished, with the new acetates as originating material, by modifying in a simple manner the retrogression or partial saponification effected after the actual acetylation, in such a way as to destroy these sulfuric esters during the course of the process itself.

It is known from patent literature that the ordinary method of saponification consists in adding a small amount of water to the reacting mass and delaying precipitation, or in adding a small amount of water and raising the temperature for the time necessary to effect the desired solubility, or again in adding, simultaneously with the said small amount of water, a fresh quantity of sulfuric acid, or a certain amount of a salt with acid reaction (for instance sodium bisulphate). This latter salt then plays the part of an accelerating agent in order to reduce both time and temperature necessary. A certain amount of alcohol may be added.

The present process is carried out in two phases. In the first phase an aqueous solution of acetic acid or formic acid, or both, is gradually added to, and intimately mixed with, the transparent viscous mass obtained by acetylation in a known manner. The amount of said solution is so chosen that the amount of water introduced by this means is just sufficient to decompose the excess of acetic anhydride, and that the amount of acid is sufficient to prevent incipient flocculation. The temperature rises during this operation and is then reduced, by cooling, to the initial temperature, or sufficiently near thereto as to prevent any modification of the cellulose acetate during the second phase.

The second phase consists in incorporating a further quantity of an aqueous solution of acetic acid or formic acid into the mass, said solution also containing, however, such an amount of hydrochloric acid that the number of H- (i. e. hydrogen) ions introduced thereby is at least equal to or greater than the number of H-ions introduced by the sulfuric acid primarily employed as the esterifying catalyst. Moreover, the relative proportions in the mixture are so computed that the total quantity of water in the mass is 5% to 15% of the total of the acids present after the last drop of the second saponification bath has been introduced.

In these circumstances the partial saponification of the cellulose acetate proceeds, as a rule, in a perfectly homogeneous manner, and is accompanied by the destruction of the aceto-sulfuric esters of the cellulose.

If desired, the operation may be accelerated by slightly raising the temperature, whereafter it is completed as usual by precipitating the cellulose acetate in water or in any other flocculating agent and washing it a sufficient number of times with warm water prior to transferring it to the dryer.

*Example*

A transparent solution of cellulose acetate is produced by mixing:—
18 kg. of boiled cotton,
80 kg. of acetic acid,
45 kg. of acetic anhydride, and
0.813 kg. of sulfuric acid (density 1.84).

This solution is clear and transparent and may be brought to a temperature of 42° C. either by the heat developed during the reaction; or by the circulation of hot water in the double jacket of the walls of the acetylator or other suitable mechanical means, artificial heating being used if the solution has been standing a long time and permitted to cool. This solution is heated until a sample, after flocculation, washing and drying, gives an acetyl value of 46% to 48% as determined, for instance, by the method described in the "Moniteur Quesneville," September, 1913. The next step is to introduce 25 kg. of 60% acetic acid gradually into the mixture, the temperature rising about 12° C. After cooling down to 41° C., 20 kg. of 60% acetic acid containing about 0.74 kg. of dry hydrochloric acid are added in the course of about 45 minutes. The temperature of 41° C. is maintained as long as is necessary to furnish at the end of the operation a cellulose acetate (acetyl value 38 to 43%) corresponding to complete solubility in acetone. The product is then flocculated by adding 45 kg. of water, and the operation terminates with the usual hot and cold washings.

Having now fully described my invention, what I claim and desire to secure by Letters Patent is:—

1. A process of manufacturing cellulose acetates intended for subsequent industrial utilizaiton; characterized by the fact that, after acetylation in the presence of sulfuric acid as catalyst, saponification is effected in two phases; the first phase consisting in destroying the excess of the acetic anhydride and restoring to a temperature bordering on that which existed prior to the commencement of the operation; whilst the second phase consists in adding a bath composed of a mixture of water, a lower fatty acid and hydrochloric acid, in proportions strictly complying with the requirement that the number of H-ions introduced by the hydrochloric acid is at least equal to the number of H-ions introduced by the sulfuric acid used as the esterification catalyst.

2. In the manufacture of cellulose acetates intended for subsequent industrial utilization and wherein acetylation is performed in the presence of sulfuric acid as catalyst; a process of saponifying the viscous mass thus obtained in two phases; the first phase consisting in gradually mixing with the mass an aqueous solution of a lower fatty acid such that the amounts of water and acid thereby introduced are respectively sufficient to decompose the excess of acetic anhydride and to prevent incipient flocculation; and the second phase consisting in incorporating, after restoration of substantially the initial temperature, a further quantity of an aqueous solution of a lower fatty acid containing sufficient hydrochloric acid to ensure that the number of H-ions introduced thereby is not less than the number of H-ions introduced by the sulfuric acid primarily employed as the esterifying catalyst.

3. A process of manufacturing cellulose acetates intended for subsequent industrial utilization; consisting in performing acetylation in the presence of sulfuric acid as catalyst; then gradually mixing with the mass an aqueous solution of a lower fatty acid such that the amounts of water and acid thereby introduced are respectively sufficient to decompose the excess of acetic anhydride and to prevent incipient flocculation; then incorporating, after restoration of substantially the initial temperature, an aqueous solution of acetic acid containing sufficient hydrochloric acid to ensure that the number of H-ions introduced thereby is not less than the number of H-ions introduced by the sulfuric acid primarily employed as the esterifying catalyst; and thereafter completing the operation by precipitating the cellulose acetate in a flocculating agent, and washing and drying the same.

4. A process of manufacturing cellulose acetates intended for subsequent industrial utilization; consisting in first obtaining a transparent solution of cellulose acetate from approximately 18 parts of boiled cotton, 80 parts of acetic acid, 45 parts of acetic anhydride and 0.813 parts of sulfuric acid (density 1.84); then heating this solution to about 42° C., then introducing about 25 parts of 60% acetic acid gradually into the mixture, then reducing the temperature to about 41° C., then adding about 20 parts of 60% acetic acid containing 0.739 parts of dry hydrochloric acid, the temperature being maintained at about 41° C. long enough to furnish at the end of the operation a cellulose acetate corresponding to complete solubility in acetone; next adding about 45 parts of water to flocculate the product, and thereafter completing the operation by washing.

5. A process of manufacturing cellulose acetates intended for subsequent industrial utilization; consisting in subjecting cellulose to a mixture of acetic anhydride and sulfuric acid; then heating the resultant nearly clear solution and gradually introducing acetic acid into it; then reducing the temperature and adding a mixture of acetic acid and hydrochloric acid, and maintaining the temperature long enough to furnish at the end of the operation a cellulose acetate corresponding to complete solubility in acetone; then adding water to flocculate the product; and thereafter completing the operation by washing.

In testimony whereof I affix my signature.

HENRI LOUIS BARTHELEMY.